United States Patent [19]

Gilhousen

[11] Patent Number: 4,504,925
[45] Date of Patent: Mar. 12, 1985

[54] SELF-SHIFTING LIFO STACK

[75] Inventor: Klein S. Gilhousen, San Diego, Calif.

[73] Assignee: M/A-Com Linkabit, Inc., San Diego, Calif.

[21] Appl. No.: 340,388

[22] Filed: Jan. 18, 1982

[51] Int. Cl.³ .............................................. G06F 13/00
[52] U.S. Cl. ................................................. 364/900
[58] Field of Search ... 364/200 MS File, 900 MS File

[56] References Cited

U.S. PATENT DOCUMENTS

| | | | |
|---|---|---|---|
| 3,351,917 | 11/1967 | Shimabukuro | 364/900 |
| 3,786,432 | 1/1974 | Woods | 364/200 |
| 3,810,117 | 5/1974 | Healey | 364/200 |
| 3,868,644 | 2/1975 | Healey | 364/200 |
| 3,953,834 | 4/1976 | Burkett | 364/900 |
| 4,138,732 | 2/1979 | Suzuki | 364/900 |

OTHER PUBLICATIONS

Mead & Conway, "Introduction to VLSI Systems", Addison-Wesley, 1980, pp. 242-262.

Primary Examiner—Raulfe B. Zache
Assistant Examiner—David Y. Eng
Attorney, Agent, or Firm—Baker, Maxham, Callan & Jester

[57] ABSTRACT

A self-shifting last-in-first-out stack for a data processing system, including a plurality of parallel linear arrays of data storage cells interconnected for enabling stored data to be shifted to or from an adjacent cell within the same array. The parallel (n)th cells from the top of the stack in the respective arrays define the (n)th word level in the stack. The stack further includes a control circuit having a linear array of control cells corresponding to the liner arrays of data storage cells, with each (n)th control cell in the array from the top of the stack being connected to the corresponding word level of data storage cells and its adjacent word levels of data storage cells for sensing the storage states of the corresponding word level of data storage cells and its adjacent word levels of data storage cells, and in response to the sensed states, for causing stored data to be shifted from each cell of the (n)th word level into the cells of the (n+1)th word level whenever the (n)th word level is full, the (n+1) word level is empty and the (n−1) word level is full; and for causing stored data to be shifted into each cell of the (n)th word level from the cells of the (n+1)th word level whenever the (n)th word level is empty, the (n+1)th word level is full and the (n−1)th word level is empty, wherein n is an integer greater than one.

31 Claims, 8 Drawing Figures

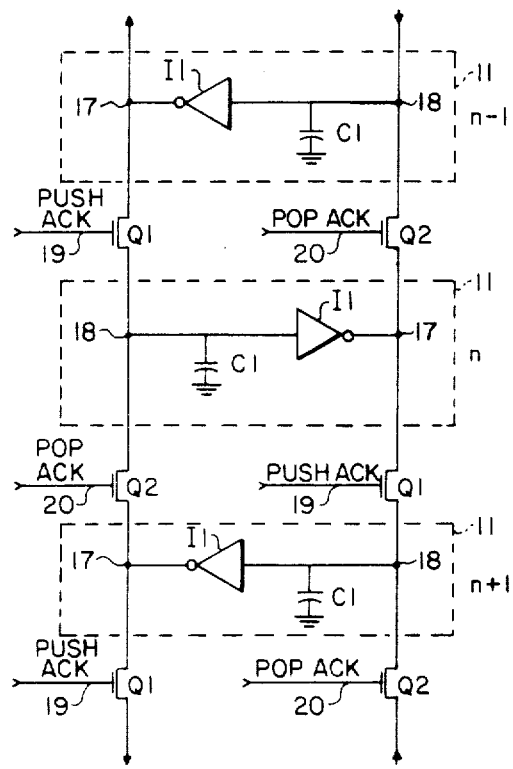
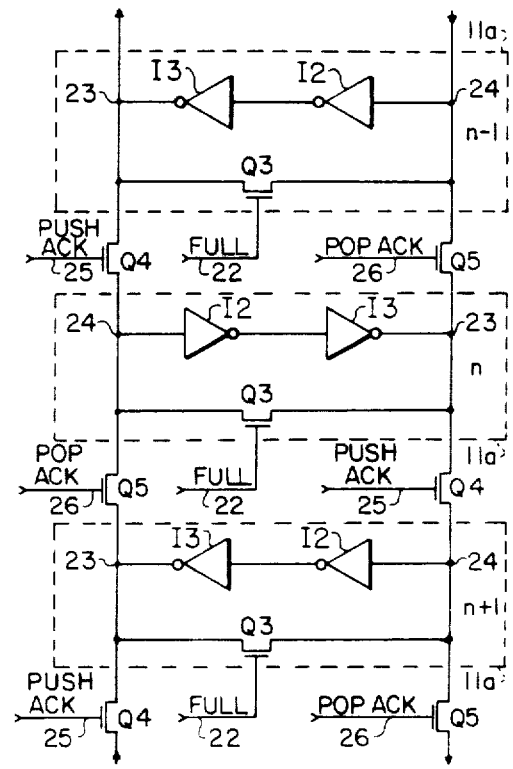
FIG. 3     FIG. 4
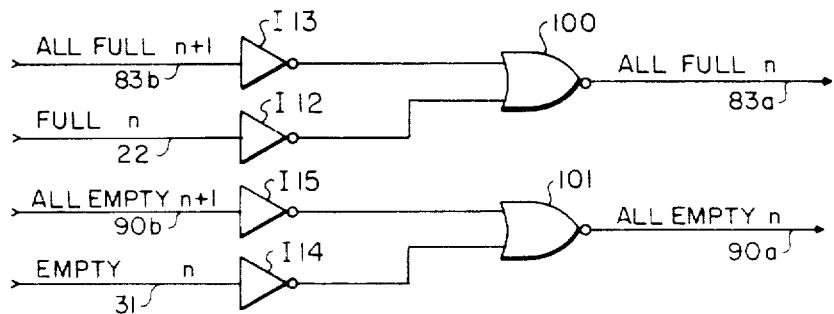
FIG. 8

SELF-SHIFTING LIFO STACK

BACKGROUND OF THE INVENTION

The present invention generally pertains to data processing systems and is particularly directed to an improvement in last-in-first-out (LIFO) stacks.

A stack is used in a data processing system to temporarily store data. A LIFO stack is one in which data is stored by "pushing" the data into the stack from the top, and in which data is retrieved by "popping" data out of the stack from the top. The operation of adding data to the stack is referred to as a "push"; and the operation of retrieving data from the stack is referred to as a "pop".

Stacks are usually implemented in data processing systems as virtual stacks through the use of random access memories (RAM's) addressed by up/down counters. This is done by programming the data processing system to maintain the up/down counter in a register and then using the register to index the stack's base address. Very large virtual stacks can be realized in this way. However, the penalty paid for this is speed. A push or a pop requires both a register increment and an indexed memory access, not to mention the instruction fetch cycle. A slower, but more common scheme is to store a stack pointer in the topmost data storage cell of the address space reserved for the stack. This scheme requires three memory cycles, one to increment the stack pointer, one to store the incremented pointer, and one to access the data storage cell.

SUMMARY OF THE INVENTION

The present invention is a self-shifting LIFO stack for a data processing system. The stack of the present invention essentially includes a linear array of data storage cells interconnected for enabling stored data to be shifted to or from an adjacent cell; and a control circuit having a linear array of control cells corresponding to the linear array of data storage cells, with each (n)th control cell in the array from the tope of the stack being connected to the corresponding data storage cell and its adjacent data storage cells for sensing the storage states of the corresponding data storage cell and its adjacent data storage cells, and in response to the sensed states, for causing stored data to be shifted from the (n)th cell in the array of data storage cells from the top of the stack into the (n+1)th cell whenever the (n)th cell is full, the (n+1)th cell is empty and the (n−1)th cell is full; and for causing stored data to be shifted into the (n)th cell from the (n+1)th cell whenever the (n)th cell is empty, the (n+1)th cell is full and the (n−1)th cell is empty, wherein n is an integer greater than one. The above-stated decision rule of the control circuit for determining whether data is to be shifted and in which direction is modified for the top and bottom data storage cells in the stack to the extent necessary for interfacing the stack with external data channels, such as an input/output device and/or a memory. Such modification is described as a part of the description of the preferred embodiment.

In accordance with the above-stated decision rule, full cells tend to be pushed to the top of the stack and empty cells tend to fall to the bottom when the stack is less than half full. Another effect of the rule is to inter-leave full and empty cells at and near the top of the stack and to pack the stack tightly full at and near the bottom of the stack when the stack is more than half full. Because the stack does not know a priori whether the next operation will be a push or a pop, it is desirable to keep both full and empty cells near the top so that either operation can quickly be accomodated.

Another advantage is that data is shifted between the cells automatically without the necessity for global control signals to run through the stack. In fact, the only global signal wires absolutely required are power and ground. A global reset may be desirable but is not required. This results in a very compact layout and extremely high speed operation since there are no slow, high fanout drivers required to generate the global control signals required by most prior art stack structures.

The stack of the present invention is particularly useful in providing an elastic speed buffer between a computing data processor and a random access memory (RAM). Such a scheme provides a data processing system with the speed of the stack design of the present invention together with the density and size of a large RAM system. The top of the stack is interfaced with the data processor and bottom of the stack is interfaced with the RAM. The overall effect of this scheme is much like the vacuum columns used in large tape drives to buffer the reel drive motors, which have much inertia, from the tape capstan drive motors which have relatively low inertia.

The above-stated decision rule does present one problem, however. Such problem is best understood by referring to Table I.

TABLE I

| N−2 | N−1 | N | N+1 | N+2 |
|---|---|---|---|---|
| E | E | E | E | E |
| E | E | E | E | <F |
| E | E | E | <F | E |
| E | E | E | <F | F |
| E | E | <F | E | E |
| E | E | <F | E | F |
| E | E | <F | F> | E |
| E | E | <F | F | F |
| E | F | E | E | E |
| E | F | E | E | <F |
| E | F | E | F | E |
| E | F | E | F | F |
| E | F | F> | E | E |
| E | F | F> | E | F |
| E | F | F | F> | E |
| E | F | F | F | F |
| F | E | E | E | E |
| F | E | E | E | <F |
| F | E | E | <F | E |
| F | E | E | <F | F |
| F | E | F | E | E |
| F | E | F | E | F |
| F | E | F | F> | E |
| F | E | F | F | F |
| F | F> | E | E | E |
| F | F> | E | E | <F |
| F | F> | E | F | E |
| F | F> | E | F | F |
| F | F | F> | E | E |
| F | F | F> | E | F |
| F | F | F | F> | E |
| F | F | F | F | F |

In Table I, all thirty two cases of data shifts between five successive data storage cells are set forth. In the Table I, E represents an empty cell and F represents a full cell. A "<" symbol represents a data shift between the two indicated cells in the leftward direction, while a ">" symbol represents a shift in the rightward direction.

Upon examining the table, it is seen that the stack generally works as desired. There are, however, two cases where there can be data shifts affecting cells that are two apart. These cases are EEFFE and FFEEF.

In a LIFO stack that has no access permitted at the bottom, it is believed that these two states can never occur, provided that the data processor accessing the stack does not run too fast and that the data shifts are more or less uniform in speed.

In the case of a LIFO stack that has access permitted at the bottom as described above, however, these problem cases are a distinct possibility. They can occur following a condition when the stack is filled over half full so that several cells in a row at the bottom are full. If the data is then popped from a number of cells at the top of the stack, such that the top of the all-full area at the bottom of the stack begins to shrink, and the bottom access device then pops an empty cell, the empty cell then starts to bubble up through the stack from the RAM interfaced with the bottom cell in accordance with the elastic speed buffer scheme. Just before the empty cell reaches the top of the formerly all-full area, a five cell region may look like FEFFF. When the empty cell reaches the bottommost cell of such five cell region, the region becomes, FEFFE. A data shift is initiated between the bottommost cell and the next-to-bottommost cell of the five cell region. If an instant later, the top most cell of the region becomes empty, as it well might, a data shift is initiated between the middle cell and the one above it. This latter data shift could cut off a gating pulse of the ongoing data shift, thus resulting in shorter than standard gating pulses and the possibility of malfunction. This general type of misbehavior is known as a "renege".

To obviate this problem, it is preferable that the control circuit of the stack of the present invention includes a renege prevention network for preventing the control circuit from causing stored data to be shifted from the (n)th cell into the (n+1)th cell while the control circuit is causing stored data to be shifted either into the (n+2)th cell from the (n+3)th cell or into the (n−2)th cell from the (n−1)th cell, and for preventing the control circuit from causing data to be shifted into the (n)th cell from the (n+1)th cell while the control circuit is causing stored data to be shifted either from the (n+2)th cell into the (n+3)th or from the (n−2)th cell into the (n−1)th cell.

The control circuit can control the shifting of data in parallel linear arrays of data storage cells simultaneously. Accordingly, to economize on the size of the control circuit, the preferred embodiment of the stack of the present invention includes a plurality of parallel linear arrays of data storage cells interconnected for enabling stored data to be shifted to or from an adjacent cell within the same array, wherein the parallel (n)th cells from the top of the stack in the respective arrays define the (n)th word level in the stack; and a control circuit having a linear array of control cells corresponding to the linear arrays of data storage cells, with the (n)th control cell in the array from the top of the stack being connected to the corresponding word level of data storage cells and its adjacent word levels of data storage cells for sensing the storage states of the corresponding word level of data storage cells and its adjacent data storage cells, and in response to the sensed states, for causing stored data to be shifted from each cell of the (n)th word level into the cells of the (n+1)th word level whenever the (n)th word level is full, the (n+1)th word level is empty and the (n−1)th word level is full; and for causing stored data to be shifted into each cell of the (n)th word level from the cells of the (n+1)th word level whenever the (n)th word level is empty, the (n+1)th word level is full and the (n−1)th word level is empty, wherein n is an integer greater than one.

An additional stack including a discrete array of data storage cells can be combined with the multiple-array stack for effecting a serial-to-parallel conversion of data entered serially from an external data channel for parallel entry into the top word level of the multiple-array stack.

Further features of the present invention are described in relation to the description of the preferred embodiment.

BRIEF DESCRIPTION OF THE DRAWING

FIG. 3 is a schematic diagram of a typical dynamic data storage cell included in the preferred embodiments of the stack.

FIG. 4 is a schematic diagram of a typical static data storage cell alternatively included in the preferred embodiments of the stack instead of the dynamic cell of FIG. 3.

FIG. 8 is a schematic diagram of a typical status cell included in the stack status storage circuit of the preferred embodiments of the stack.

DESCRIPTION OF THE PREFERRED EMBODIMENT

Figure 1:
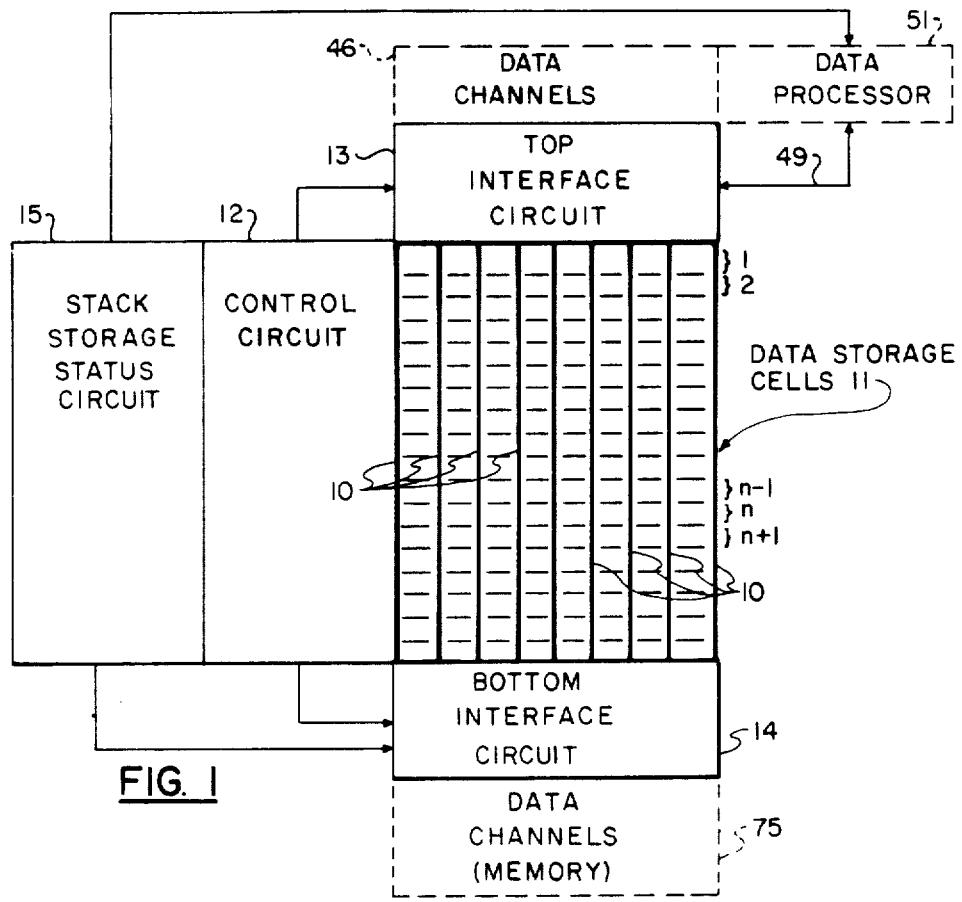
FIG. 1 is a block diagram of the preferred embodiment of the stack of the present invention

Referring to FIG. 1, the preferred embodiment of the stack of the present invention includes a plurality of linear arrays 10 of data storage cells 11, a control circuit 12, a top interface circuit 13, a bottom interface circuit 14 and a stack storage status circuit 15.

The data storage cells 10 are interconnected for enabling stored data to be shifted to or from an adjacent cell within the same array 10. The parallel (n)th cells 11 from the top of the stack in the respective arrays define the (n)th word level in the stack.

Referring to FIG. 3, each dynamic data storage cell 11 includes an inverter I1. The stray capacitance C1 at the input of the inverter I1 stores the data shifted into the cell.

Within each linear array, the output 17 of each (n)th cell in the array from the top of the stack is connected to the input 18 of the (n+1)th cell by a push gate Q1 and is connected to the input 18 of the (n−1)th cell by a pop gate Q2; and the input 18 of each (n)th cell is connected to the output 17 of the (n+1)th cell by a pop gate Q2 and is connected to the output 17 of the (n+1)th cell by a push gate Q1. The push gates Q1 and pop gates Q2 are NMOS field effect transistors (FET's). Each push gate Q1 is connected to the control circuit 12 for shifting data down from the top of the stack in response to a push acknowledge (PUSH ACK) signal on line 19 from the control circuit 12. The push acknowledge signal and all other control signals are active at positive logic levels, i.e. at logic level "1". Each pop gate Q2 is connected to the control circuit 12 for shifting data up toward the top of the stack in response to a pop acknowledge (POP ACK) on line 20 from the control circuit 12.

For many data processing systems, it is preferable that the stack include static data storage cells. Referring to FIG. 4, each static data storage cell 11a includes a pair of series- connected inverters I2 and I3, and a hold gate Q3 for completing a feedback loop in the storage cell 11a. The hold gate Q3 is an NMOS FET. The hold gate Q3 completes the feedback loop in response to a FULL indication signal on line 22 from the control circuit 12. Within each linear array the output 23 of each (n)th cell in the array from the top of the stack is connected to the input 24 of the (n+1)th cell by a push gate Q4 and is connected to the input 24 of the (n−1)th cell by a pop gate Q5; and the input 24 of each (n)th cell is connected to the output 23 of the (n+1)th cell by a pop gate Q5 and is connected to the output 23 of the (n−1)th cell by a push gate Q4. The push gates Q4 and pop gates Q5 are NMOS FETs. Each push gate Q4 is connected to the control circuit 12 for shifting data down from the top of the stack in response to a push acknowledge signal on line 25 from the control circuit 12. Each pop gate Q5 is connected to the control circuit 12 for shifting data up toward the top of the stack in response to a pop acknowledge signal on line 26 from the control circuit 12.

The control circuit 12 is connected to the arrays 10 of data storage cells 11 for sensing the storage states of the data storage cells, and in response to the sensed states, for causing stored data to be shifted from each cell of the (n)th word level into the cells of the (n+1)th word level whenever the (n)th word level is full, the (n+1)th word level is empty and the (n−1)th word level is full; and for causing stored data to be shifted into each cell of the (n)th word level from the cells of the (n+1)th word level whenever the (n)th word level is empty, the (n+1)th word level is full and the (n−1)th word level is empty, wherein n is an integer greater than one.

The control circuit includes a linear array of control cells corresponding to the word levels. The control cells are interconnected for communicating the storage state of the corresponding word levels of data storage cells to and from the adjacent control cells.

Figure 5:
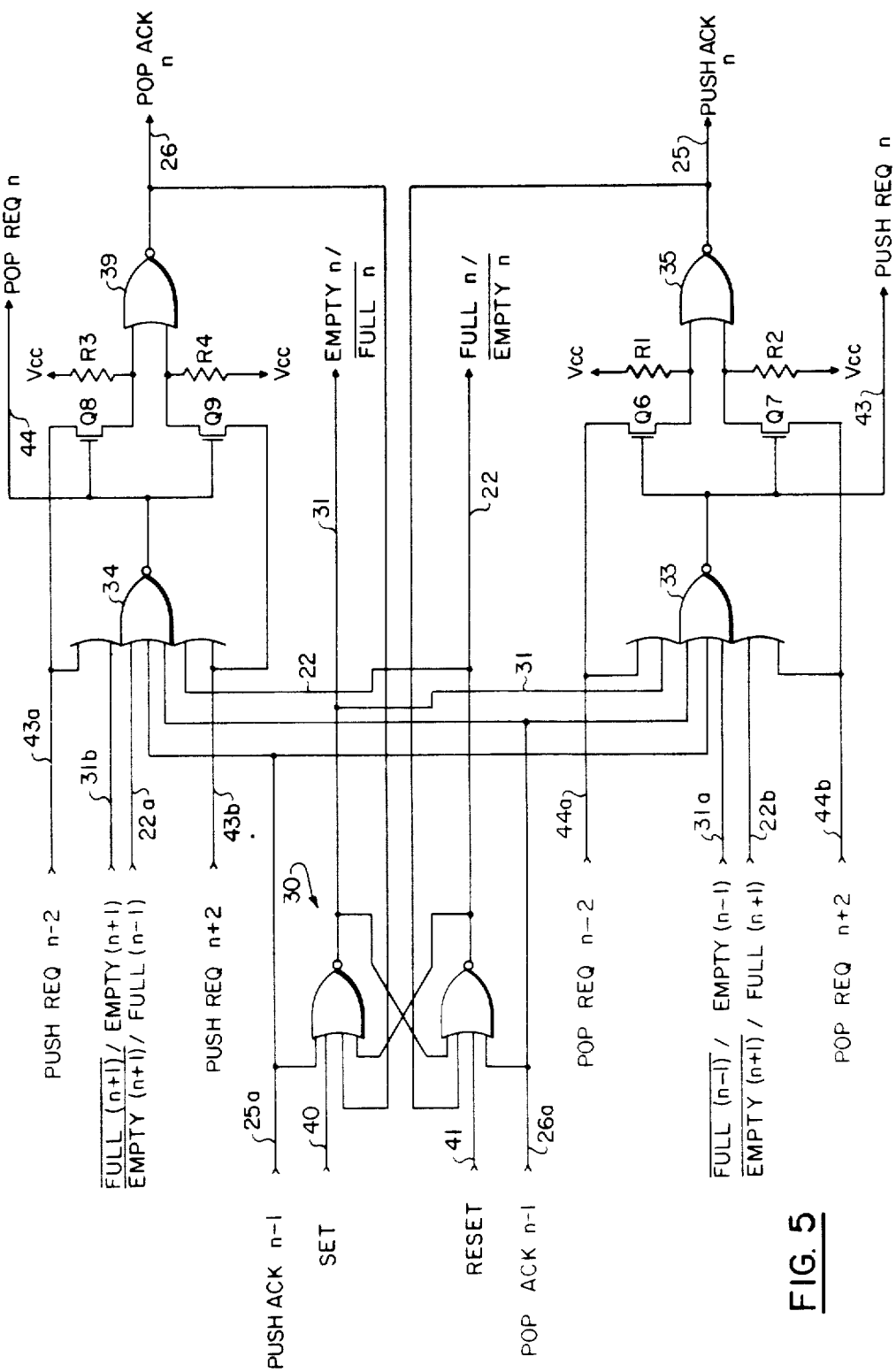
FIG. 5 is a schematic diagram of a typical control cell included in the control circuit of the preferred embodiments of the stack.

Referring to FIG. 5, each (n)th control cell in the array from the top of the stack includes a cell-state flip-flop 30 for providing indication signals on lines 31 and 22 indicating the storage state of the (n)th word level of data storage cells. A "full" indication is provided by a logic level high signal on line 22 and a logic level low signal on line 31. An "empty" indication is provided by a logic level high signal on line 31 and a logic level low signal on line 22.

Each (n)th control cell further includes a first control gate 33 and a second control gate 34. The first and second control gates 33 and 34 are NOR gates which are preferred for NMOS designs because they are faster than NAND gates.

The first control gate 33 is connected via renege network gate 35 and line 25 to the push gate Q4 between the (n)th data storage cell and the (n+1)th data storage cell (FIG. 4) in each linear array 10 of data storage cells for providing a push acknowledge signal to the push gate Q4 in response to indication signals from the cell-state flip-flop 30 of the (n)th control cell on line 31 indicating that the (n)th word level of data storage cells is full, from the cell-state flip-flop of the (n+1)th control cell on line 22b indicating that the (n+1)th word level of data storage cells is empty, and from the cell-state flip-flop of the (n−1)th control cell on line 31a indicating that the (n−1)th word level of data storage cells is full. Since the first control gate 33 is a NOR gate performing an AND function, it requires negative logic input levels. When the (n)th word level is full a "zero" level logic signal is provided on the empty n line 31. Therefore, it is the empty n line 31 that is used for providing a zero logic level input signal to the NOR gate for indicating that the (n)th word level is full. Likewise the full n line 22 is used for providing a zero logic level input signal to the NOR gate 34 for indicating that the (n)th word level is empty.

The second control gate 34 is connected via renege network gate 39 and line 26 to the pop gate Q5 between the (n)th data storage cell and the (n+1)th data storage cell (FIG. 4) in each linear array 10 of data storage for providing a pop acknowledge signal to the pop gate Q5 in response to indication signals from the cell-state flip-flop 30 of the (n)th control cell on line 22 indicating that the (n)th word level of data storage cells is empty, from the cell-state flip-flop of the (n+1) control cell on line 31b indicating that the (n+1)th word level of data storage cells is full, and from the cell-state flip-flop of the (n−1)th control cell on line 22a indicating that the (n−1)th word level of data storage cells is empty.

The control gates of the (n−1)th control cell are connected via lines 25a and 26a to the control gates 33, 34 of the (n)th control cell for inhibiting the control gates 33, 34 of the (n)th control cell from providing push acknowledge and pop acknowledge signals on lines 25 and 26 respectively, whenever the control gates of the (n−1)th control cell provide either push acknowledge or pop acknowledge signals on lines 25a or 26a respectively. This is required to prevent transient logic levels from occurring during the setting or resetting of the cell-state flip-flop of the (n−1)th control cell from causing spurious push or pop request signals at the outputs of the first and second control gates 33, 34 of the (n)th control cell respectively.

The control gates 33, 34 of the (n)th control cell are connected to the cell-state flip-flops 30 of both the (n)th and (n+1)th control cells via lines the renege network gates 35, 39 and lines 25 and 26 for setting or resetting such flip-flops in response to push acknowledge and pop acknowledge signals on lines 25 and 26 so that the indication signals on lines 22 and 31 from the flip-flops of the (n)th and (n+1)th control cells indicate the storage states of the (n)th and (n+1)th word levels of data storage cells following the shift of data between the (n)th and (n+1)th word levels of data storage cells in response to the push acknowledge or pop acknowledge signal.

The cell-state flip-flop 30 also may be set or reset in response to external set and reset signals applied on lines 40 and 41 respectively to all of the cell-state flip-flops 30 of the control circuit 12 simultaneously when it is desired to clear the stack of data.

The hold gate Q3 in each static data storage cell 11a of the corresponding word level "n" is connected via line 22 to the cell-state flip-flop 30 in the corresponding control cell for completing the feedback loop in the data storage cell 11a in response to an indication signal on line 22 fron the flip-flop 30 indicating that the corresponding word level of data storage cells is full.

The control circuit further includes a renege prevention network for preventing the control circuit 12 from providing pop acknowledge signals on line 26 and to the pop gate Q5 between the (n)th data storage cell and the (n+1)th data storage cell in each linear array 10 of data storage cells 11a while a prior push acknowledge signal is provided to either the push gate Q4 between the (n+2)th data storage cell and the (n+3)th data storage cell or the push gate Q4 between the (n−2)th data storage cell and the (n−1)th data storge cell, and for preventing the control circuit 12 from providing push acknowledge signals on line 25 to the push gate Q4 between the (n)th data storage cell and the (n+1)th data storage cell in each linear array 10 of data storage cells 11a while a prior pop acknowledge signal is provided to either the pop gate Q5 between the (n+2)th data storage cell and the (n+3)th data storage cell or the pop gate Q5 between the (n−2)th data storage cell and the (n−1) data storage cell. The renege prevention network is integrated with the first and second control gates 33, 34 in each control cell (FIG. 5). For each control cell, the renege prevention network includes the first and second control cells 33, 34 first and second renege network gates 35, 39, FET's Q7, Q8, Q9 and Q10 and resistances R1, R2, R3 and R4.

The first control gate 33 provides a push request (PUSH REQ) signal on line 43 when it causes a push acknowledge signal to be provided on line 25. The second control gate 34 provides a pop request (POP REQ) signal on line 44 when it causes a pop acknowledge signal to be provided on line 26.

Line 43 is connected to the gates of the FET's Q6 and Q7. The FET Q6 is connected between the pop request line 44a from the (n−2)th control cell and one input of the first renege network NOR gate 35. The resistance R1 is connected between the one input of the NOR gate 35 and a supply voltage terminal. $V_{CC}$. The FET Q7 is connected between the pop request line 44b from the (n+2)th control cell and the other input of the first renege network NOR gate 35. The resistance R2 is connected between the other input of the NOR gate 35 and the supply voltage terminal $V_{CC}$.

The combination of the first renege network NOR gate 35, the FET's Q6 and Q7 and resistances R1 and R2 constitutes a first interlock-circuit connected to the output line 43 of the first control gate 33 of the (n)th control cell and to the respective outputs on lines 44a and 44b of the second control gates of the (n−2)th and (n+2)th control cells for responding to a pop request signal on either line 44a or 44b from either of such second control gates by preventing a subsequent push acknowledge signal from being provided on line 25 to the push gate Q4 between the (n)th and the (n+1)th data storage cells during either such pop request signal. When a push request signal is provided on line 43 simultaneously with a pop request signal on line 44a, the NOR gate 33 may hang for an indeterminable period in a metastable condition until one signal differs from the other by an amount greater than the gate threshold voltage of the FET Q6. When such difference occurs, signal priority is established and the subsequent signal is locked out.

Line 44 is connected to the gates of the FET's Q8 and Q9. The FET Q8 is connected between the push request line 43a from the (n−2)th control cell and one input of the second renege network NOR gate 39. The resistance R3 is connected between the one input of the NOR gate 39 and the supply voltage terminal $V_{CC}$. The FET Q9 is connected between the push request line 43b from the (n+2)th control cell and the other input of the second renege network NOR gate 39. The resistance R4 is connected between the other input of the NOR gate 35 and the supply voltage terminal $V_{CC}$.

The combination of the second renege network NOR gate 39, the FET's Q8 and Q9 and resistances R3 and R4 constitute a second interlock circuit connected to the output line 44 of the second control gate 34 of the (n)th control cell and to the respective outputs on lines 43a and 43b of the first control gates of the (n−2)th and (n+2)th control cells for responding to push request signal on either line 43a or 43b from either of such first control gates by preventing a subsequent pop acknowledge signal from being provided on line 26 to the pop gate Q5 between the (n)th and the (n+1)th data storage cells during either such push request signal.

In the control cell corresponding to the top word level of data storage cells, the push request line 43a and the pop request line 44a are grounded. In the control cell corresponding to the bottom word level data storage cells, the push request line 43b, and the pop request line 44b are grounded. In other respects, the control cells corresponding to the top and bottom word levels of control cells are constructed as shown in FIG. 5 described above.

In the control cell corresponding to the top word level of data storage cells, the first control gate 33 is connected via the renege network NOR gate 35 and line 25 to the push gate Q4 between the top data storage cell and the second data storage cell in each linear array 10 of data storage cells for providing a push acknowledge signal to the push gate Q4 in response to an external push stack signal on line 22a and indication signals from the cell-state flip-flop 30 of the top control cell on line 22 indicating that the top word level of data storage cells is full and on line 31b from the cell-state flip-flop of the second control cell indicating that the second word level of data storage cells is empty.

The second control gate 34 is connected via the renege network NOR gate 39 and line 26 to the pop gate Q5 between the top data storage cell and the second data storage cell in each linear array data storage cells for providing a pop acknowledge signal to the pop gate Q5 in response to an external pop stack signal on line 31a and indication signals from the cell state flip-flop 30 of the top control cell on line 31 indicating that the top word level of data storage cells is empty and on line 22b from the cell-state flip-flop of the second control cell indicating that the second word level of data storage cells is full. The external push stack signal and external pop stack signal are provided by the top interface circuit 13.

Figure 6:
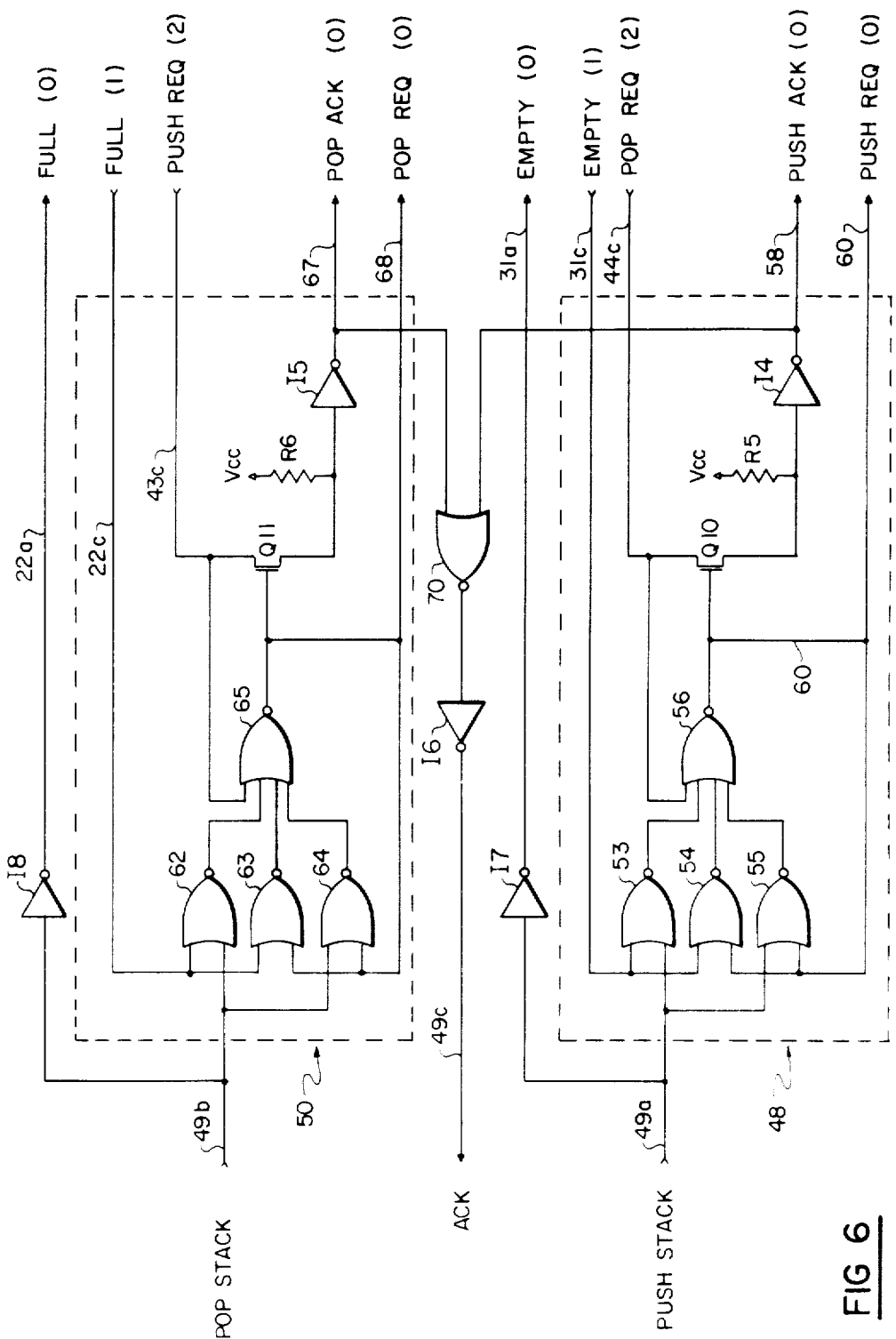
FIG. 6 is a schematic diagram of the top interface circuit in the stack of FIGS. 1 and 2.

Referring FIG. 6, the top interface circuit 13 includes a first logic circuit 48 for shifting data into the top word level of the stack from external parallel data channels 46 in response to an external push stack signal on line 49a from an external data processor 51, and a second logic circuit 50 for shifting data from the top word level of the stack into the external parallel data channels 46 in response to an external pop stack signal on line 49b.

The first logic circuit 48 includes four NOR gates 53, 54 55, 56 interconnected as shown in FIG. 6 for providing a push acknowledge signal on line 58 in response to the external push stack signal on line 49a and an indication signal on line 31c from the cell state flip-flop of the top control cell indicating that the top word level of data storage cells is empty.

Push gates Q4 are connected between the inputs 24 of the respective top data storage cells of the top word level and the external parallel data channels 46 for shifting data into the top word level data storage cell from the external parallel data channels 46 in response to the push acknowledge signal on line 58 from the first logic circuit 48.

A renege prevention network is integrated with the first logic circuit 48. The renege prevention network includes the NOR gate 56, a FET Q10 an inverter I4 and a resistance R5. The NOR gate 56 provides a push request signal on line 60 when it causes a push acknowledge signal to be provided on line 58. The FET Q10 is connected between the pop request line 44c from the control cell corresponding to the second word level and the input of the inverter I4. The resistance R5 is connected between the input of the inverter I4 and the supply voltage terminal $V_{CC}$. This renege prevention circuit is an interlock circuit that responds to a pop request signal on line 44c from the second control gate 34 of the control cell corresponding to the second word level by preventing a subsequent push acknowledge signal from being provided on line 58 to the push gates Q4 in each linear array 10 of data storage cells between the inputs 24 of the data storage cells of the top word level and the corresponding external data channels 46.

The second logic circuit 50 of the top interface circuit 13 includes four NOR gates 62, 63, 64, 65 interconnected as shown in FIG. 6 for providing a pop acknowledge signal on line 67 in response to the external pop stack signal on line 49b and an indication signal on line 22c from the cell-state flip-flop of the top control cell indicating that the top word level of data storage cells is full.

Pop gates Q5 are connected between the output 23 of the respective top data storage cells of the top word level and the external parallel data channels 46 for shifting data from the top word level of data storage cells into the external parallel data channels 46 in response to the pop acknowledge signal on line 67 from the second logic circuit 50.

A renege prevention circuit is integrated with the second logic circuit 50. The renege prevention network includes the NOR gate 65, a FET Q11, an inverter I5 and a resistance R6. The NOR gate 65 provides a pop request signal on line 68 when it causes a pop acknowledge signal to be provided on line 67. The FET Q11 is connected between the push request line 43c from the control cell corresponding to the second word level and the input of the inverter I5. The resistance R6 is connected between the input of the inverter I5 and the supply voltage terminal $V_{CC}$. This renege prevention network is an interlock circuit that responds to a push request signal on line 43c from the first control gate 33 of the control cell corresponding to the second word level by preventing a subsequent pop acknowledge signal from being provided on line 67 to the pop gates Q5 in each linear array 10 of data storage cells between the outputs 23 of the data storage cells of the top word level and the corresponding external data channels 46.

The top interface circuit 13 further includes an inverter I6 having its input connected to the output of a NOR gate 70, which in turn has its inputs connected to the push acknowledge signal line 58 from the first logic circuit 48 and the pop acknowlege signal line 67 from second logic circuit 50 for providing an acknowledge (ACK) signal on line 49c to the external data processor 51 whenever a push acknowledge signal is provided on line 58 line 49a. or a pop acknowledge signal is provided on line 67.

An inverter I7 is connected to the push stack signal line 49a for providing a pop stack signal on line 31a whenever an external push stack signal is not provided on line 49a.

An inverter I8 is connected to the pop stack signal line 49b for providing a push stack signal on line 22a whenever an external pop stack signal is not provided on line 49b. The external pop stack signal on line 49b is complementary to the external push stack signal on line 49a.

Figure 7:
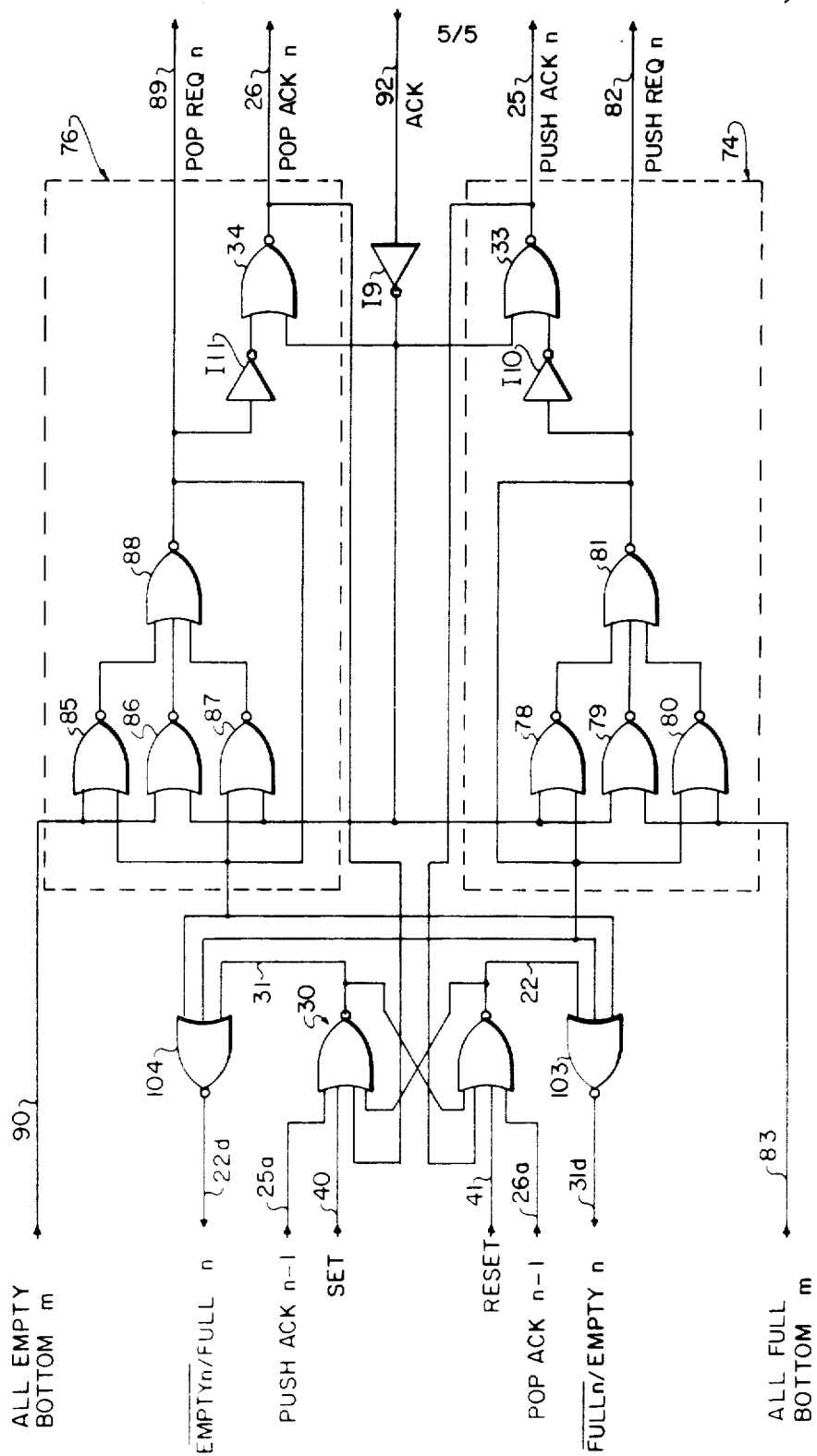
FIG 7 is a schematic diagram of the bottom interface circuit in the stack of FIGS. 1 and 2 in combination with the bottom control cell of the control circuit.

Referring to FIG. 7, the bottom interface circuit 14 is combined with the control cell corresponding to the bottom word level of the data storage cells. For simplicity of illustration, the renege prevention network in such control cell is not shown in FIG. 7. The bottom interface circuit 14 includes a first logic circuit 74 for shifting data from the bottom word level of the stack into the external parallel data channels 75 when the bottom m word levels are empty and a second logic circuit 76 for shifting data into the bottom word level of the stack from the external parallel data channels 75 when the bottom m word levels are full. "m" is an integer greater than one. The external parallel data channels 75 may be included in a RAM, access to which also is controlled by the data processor 51.

The first logic circuit 74 includes four NOR gates 78, 79, 80, 81 interconnected as shown in FIG. 7 for providing a push request signal on line 82 in response to an "all full" signal on line 83 form the cell-state flip-flops of the bottom m control cells indicating that the bottom m word levels of the stack are full.

The second logic circuit 76 includes four NOR gates 85, 86, 87, 88 interconnected as shown in FIG. 7 for providing a pop request signal on line 89 in response to an "all empty" signal on line 90 from the cell-state flip-flops of the bottom m control cells indicating that the bottom m word level of stack are empty.

The "all full" and "all empty" indication signals on lines 83 and 90 respectively are provided by a combination of the bottom m status cells included in the stack status storage circuit 15 for indicating the storage state of the bottom m word levels. The stack storage status circuit 15 includes a linear array of status cells corresponding to word levels in the stack. Referring to FIG. 8, each such status cell includes a first NOR gate 100, a second NOR gate 101, a first inverter I12 and a second inverter I13 a third inverter I14 and a fourth inverter I15. The first NOR gate 100 in the (n)th status cell provides an "all full" indication signal on line 83a in response to receiving a "full" indication signal on line 22 via the inverter I12 from the cell-state flip-flop 30 in the (n)th control cell and an "all full" signal on line 83b from the first NOR gate in the (n+1)th status cell via the inverter I13. The second NOR gate 101 in the (n)th status cell provides an "all empty" indication signal on line 90a in response to receiving an "empty" indication signal on line 31 via the inverter I14 from the cell state flip-flop in the (n)th control cell and an "all empty" signal on line 90b from the second NOR gate in the (n+1)th status cell via the inverter I15. Signals are provided on lines 83a and 90a from the status cell corresponding to the (m)th word level from the bottom of the stack to provide the indication signals on lines 83 and 90 to the bottom interface circuit of FIG. 7.

The push request signal on line 82 and the pop request signal on line 89 are provided to the data processor 51, which in turn responds to either the push request signal or the pop request signal by providing an acknowledge (ACK) signal on line 92 back to the bottom interface circuit when the external data channels are in condition for receiving or providing data respectively. The acknowledge signal on line 92 is inverted by an inverter I9 and provided to one input of the first control gate 33 and one input of the second control gate 34 respectively. The first and second control gates are NOR gates.

The push request signal on line 82 is inverted by an inverter I10 and provided to the other input of the first control gate 33. The first control gate 33 provides a push acknowledge signal on line 25 in response to the inverted acknowledge signal from the inverter I9 and the inverted push request signal from the inverter I10.

Push gates Q4 are connected between the respective outputs of the data storage cells of the bottom word level and the external parallel data channels 75 for shifting data from the bottom word level into the external parallel data channels 75 in response to the push acknowledge signal on line 25 from the first control gate 33.

The inverted acknowledge signal from the inverter I9 also is provided to respective inputs of the NOR gates 78 and 79, and causes the push request signal to be removed from line 82 when the "all full" signal indicating that the bottom m word levels are full is no longer provided on line 83. When the push request signal is removed from line 82, the acknowledge signal is removed from line 92 by the data processor 51 to complete the cycle.

The pop request signal on line 89 is inverted by an inverter I11 and provided to the other input of the second control gate 34. The second control gate 34 provides a pop acknowledgement signal on line 26 in response to the inverted acknowledgement signal from the inverter I9 and the inverted pop request signal from the inverter I11.

Pop gates Q5 are connected between the respective inputs of the data storage cells of the bottom word level and the external parallel data channels 75 for shifting data into the bottom word level from the external parallel data channels 75 in response to the pop acknowledge signal on line 26 from the second control gate 34.

The inverted acknowledge signal from the inverter I9 also is provided to respective inputs of the NOR gates 86 and 87 and causes the pop request signal to be removed from line 89 when the "all empty" signal indicating that the bottom m word levels are empty is no longer provided on line 91. When the pop request signal is removed from line 89, the acknowledge signal is removed from line 92.

To make sure that a request (whether "push" or "pop") is not taken back before it is acted upon, an inhibition network is included in the bottom interface circuit for inhibiting the provision of either a full indication signal on line $22d$ or an empty indication signal on line $31d$ from the cell-state flip-flop 30 until after the request signal is no longer present on either line 82 or line 89. The inhibition network includes first and second NOR gates 103 and 104. The first NOR gate 103 receives input signals on the "full" indication line 22 from cell-state flip-flop 30, on the "push request" indication line 81 from the first logic circuit 74 and on the "pop request" indication line 89 from the second logic circuit 76. Accordingly, an "empty" indication signal is provided on output line $31d$ from the first NOR gate 103 only when there is neither a "full" indication signal on line 22 nor a request signal on either line 82 or line 89. The second NOR gate 104 receives input signals on the "empty" indication line 31 from the cell-state flip-flop 30, on the "push request" indication line 81 from the first logic circuit 74, and on the "pop request" indication line 89 from the second logic circuit 76. Accordingly, a "full" indication signal is provided on output line $22d$ from the second NOR gate 104 only when there is neither an "empty" indication signal on line 31 nor a request signal on either line 82 or line 89.

Because the first and second control gates 33, 34 of the control cell (FIG. 5) corresponding to the next-to bottom word level require active logic level low signals for indicating empty and full conditions, the full (n) and empty (n) indication signals on lines $22d$ and $31d$ from the NOR gates 104 and 103 respectively are passed through inverters (not shown) to provide the respective corresponding full (n+1) and empty (n+1) indication signals on lines $31b$ and $22b$ to the NOR gates 33 and 34 in the control cell of FIG. 5.

The stack storage status circuit 15 is connected to the cell-state flip-flops 30 in each control cell of the control circuit 12 for providing an "all full" signal when all of the data storage cells in the array are full, and an "all empty" signal when all of the data storage cells in the array are empty.

Figure 2:
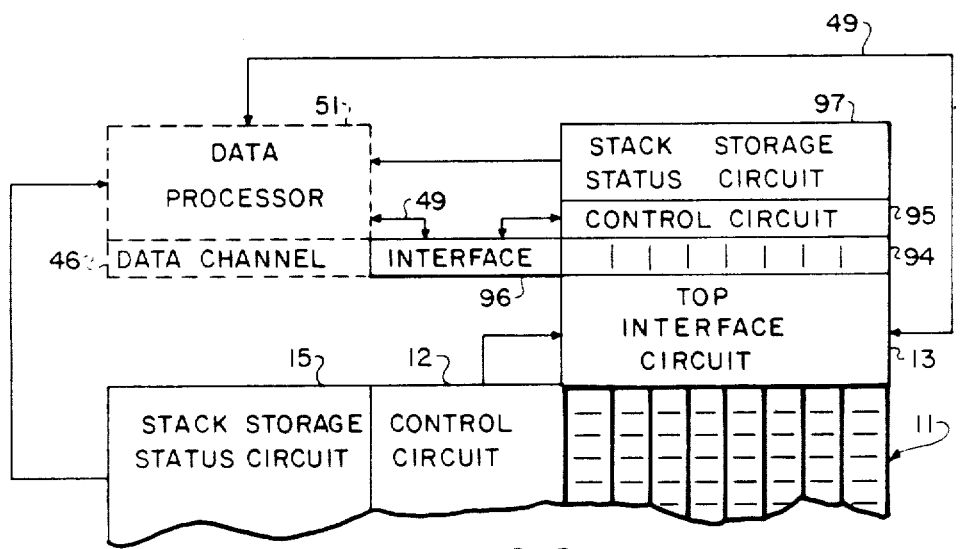
FIG. 2 is a block diagram of an alternative preferred embodiment of the stack of the present invention.

The "all full" and "all empty" signals from the stack storage circuit 15 can be used to control a serial-to-parallel conversion process to provide wider words in the stack. In this way, the overhead cost of the stack control control circuit 13 can be spread over a larger number of bits of data. Such an application is provided in the alternative preferred embodiment of the stack shown in FIG. 2. The basic stack as described above in relation to FIGS. 1 and 3-9 further includes a discrete linear array 94 of data storage cells, a second control circuit 95, a second interface circuit 96, and a second stack storage status circuit 97. These components 94, 95, 96 and 97 are constructed in the same manner as the like components 10, 12, 13 and 15 of the stack of FIG. 1.

The discrete linear array 94 of data storage cells is interconnected for enabling data to be shifted to or from an adjacent cell. The discrete array 94 includes a number of data storage cells corresponding to the number of parallel linear arrays 10 in the stack, with the cells of the discrete array 94 being coupled to the cells of the top word level of the stack for enabling data to be shifted therebetween.

The second control circuit 95 is connected to the discrete array 10 of data storage cells for causing stored data to be shifted from the (m)th cell in the discrete array 94 from one end of the discrete array 94 into the (m+1)th cell whenever the (m)th cell is full, the (m+1)th cell is empty and the (m−1)th cell is full; and for causing stored data to be shifted into the (mth) cell from the (m+1)th cell whenever the (m)th cell is empty, the (m+1)th cell is full and the (m−1)th cell is empty.

The second control circuit includes a linear array of control cells corresponding to the discrete linear array of data storage cells, wherein each (m)th control cell in the second control cell array from the one end thereof includes a cell-state flip-flop, such as the flip-flop 30 in FIG. 5, for providing indication signals indicating the storage state of the (m)th data storage cell.

The second stack storage status circuit 97 is connected to the cell-state flip-flops in each control cell of the second control circuit 95 for providing an "all empty" signal when all of the data storage cells in the discrete array are empty for enabling data to be shifted serially into the discrete array 94 from an external data channel 46 via the second interface circuit 96; and for providing an "all full" signal when all of the data storage cells in the discrete array are full for enabling data stored in the discrete array 94 to be shifted in parallel into the top word level of the stack. Data can also be shifted in the opposite direction in response to the "all full" signal and the "all empty" signal. The "all full" signal also can enable data to be shifted serially from the discrete array 94 into the external data channel 46 via the second interface circuit 96; and the "all empty" signal also can enable data to be shifted in parallel from the top word level of the stack into the discrete array 94. The direction in which the data is shifted is controlled in accordance with the push and pop instructions from the data processor 51.

I claim:

1. A self-shifting last-in-first-out stack for a data processing system, comprising a linear array of data storage cells interconnected for enabling stored data to be shifted to or from an adjacent cell; and a control circuit having a linear array of control cells corresponding to the linear array of data storage cells with each (n)th control cell from the top of the stack being connected to the corresponding data storage cell and its adjacent data storage cells for sensing the storage states of the corresponding data storage cell, and its adjacent data storage cell, and its adjacent data storage cells and in response to said sensed states, for causing stored data to be shifted from the (n)th cell in the array of data storage cells from the top of the stack into the (n+1)th cell whenever the (n)th cell is full, the (n+1)th cell is empty and the (n−1)th cell is full; and for causing stored data to be shifted into the (nth) cell from the (n+1)th cell whenever the (n)th cell is empty, the (n+1)th is full and the (n−1)th cell is empty, wherein n is an integer greater than one.

2. A stack according to claim 1, wherein within the linear array of data storage cells the output of each (n)th cell is connected to the input of the (n+1)th cell by a push gate and is connected to the input of the (n−1)th cell by a pop gate, and the input of each (n)th cell is connected to the output of (n+1)th cell by a pop gate and is connected to the output of the (n−1)th cell by a push gate;

wherein each push gate is connected to the control circuit for shifting data down from the top of the stack in response to a push signal from the control circuit; and wherein each pop gate is connected to the control circuit for shifting data up toward the top of the stack in response to a pop signal from the control circuit.

3. A stack according to claim 2, wherein the control cells are interconnected for communicating the storage state of the corresponding data storage cells to and from the adjacent control cells; and wherein each (n)th control cell in the array from the top of the stack includes a cell-state flip-flop for providing indication signals indicating the storage state of the (n)th data storage cell;

a first control gate connected to the push gate between the (n)th data storage cell and the (n+1)th data storage cell for providing a push signal to said push gate in response to indication signals from the cell-state flip-flop of the (n)th control cell indicating that the (n)th data storage cell is full, from the cell-state flip-flop of the (n+1) the control cell indicating that the (n+1)th data storage cell is empty, and from the cell-state flip-flop of the (n−1)th control cell indicating that the (n−1)th data storage cell is full; and a second control gate connected to the pop gate between the (n)th data storage cell and the (n+1)th data storage cell for providing a pop signal to said pop gate in response to indication signals from the cell-state flip-flop of the (n)th control cell indicating that the (n)th data storage cell is empty, from the cell-state flip-flop of the (n+1)th control cell indicating that the (n+1)th data storage cell is full, and from the cell-state flip-flop of the (n−1)th control cell indicating that the (n−1)th data storage cell is empty.

4. A stack according to claim 3, wherein the control gates of the (n)th control cell are connected to the control gates of the (n+1)th control cell for inhibiting the control gates of the (n+1)th control cell from providing push and pop signals whenever the control gates of the (n)th control cell provide either push or pop signals.

5. A stack according to claim 3, wherein the control gates of the (n)th control cell are connected to the cell-state flip-flops of both the (n)th and (n+1)th control cells for setting or resetting said flip-flops in response to push and pop signals from said control gates so that the indication signals from said flip-flops indicate the storage states of the (n)th and (n+1)th data storage cells following the shift of data between the (n)th and (n+1)th data storage cells in response to said push or pop signal.

6. A stack according to claim 3, wherein each data storage cell is a static storage cell that includes a hold gate for completing a feedback loop in said storage cell, said hold gate being connected to the cell-state flip-flop in the corresponding control cell for completing said loop in response to an indication signal from said flip-flop indicating that said data storage cell is full.

7. A stack according to claim 3, wherein the control circuit further comprises a renege prevention network for preventing the control circuit from providing pop signals to the pop gate between the (n)th data storage cell and the (n+1)th data storage cell while a prior push signal is provided to either the push gate between the (n+2)th data storage cell and the (n+3)th data storage cell or the push gate between the (n−2)th date storage cell and the (n−1)th data storage cell, and for preventing the control circuit from providing push signals to the push gate between the (n)th data storage cell and the (n+1)th data storage cell while a prior pop signal is provided to either the pop gate between the (n+2)th data storage cell and the (n+3)th data storage cell or the pop gate between the (n−2)th data storage cell and the (n−1)th data storage cell.

8. A stack according to claim 7, wherein the renege prevention network includes complementary interlock circuits, including a first interlock circuit connected to the output of the first control gate of the (n)th control cell and to the respective outputs of the second control gates of the (n+2)th and (n−2)th control cells for responding to a pop signal from either of the second control gates by preventing a subsequent push signal from being provided to the push gate between th (n)th and the (n+1)th data storage cells during said pop signal; and a second interlock circuit connected to the output of the second control gate of the (n)th control cell and to the respective outputs of the first control gates of the (n+2)th and (n−2)th control cells for responding to a push signal from either of the first control gates by preventing a subsequent pop signal from being provided to the pop gate between the (n)th and the (n+1)th data storage cells during said push signal.

9. A stack according to claim 3, further comprising a stack storage status circuit connected to the cell-state flip-flops in each control cell of the control circuit for providing an "all full" signal when all of the data storage cells in the array are full, and an "all empty" signal when all of the data storage cells in the array are empty.

10. A stack according to claim 9, wherein the stack storage status circuit includes a linear array of status cells corresponding to the linear array of control cells, with each (n)th status cell in the array from the top of the stack being connected to the cell-state flip-flop in the corresponding control cell and to the adjacent status cells for providing said "all full" signal to the (n−1)th status cell in response to receiving a "full" indication signal from the cell-state flip-flop in the (n)th control cell and an "all full" signal from the (n+1)th status cell, and for providing said "all empty" signal to the (n−1)th status cell in response to receiving an "empty" indication signal from the cell-state flip-flop in the (n)th control cell and an "all empty" signal from the (n+1)th status cell.

11. A stack according to claim 3, wherein the control cell corresponding to the top data storage cell in the stack comprises a cell-state flip-flop for providing indication signals indicating the storage state of the top data storage cell;

a first control state connected to the push gate between the top data storage cell and the second data storage cell for providing a push signal to said push gate in response to an external push stack signal and indication signals from the cell-state flip-flop of the top control cell indicating that the top data storage cell is full and from the cell-state flip-flop of the second control cell indicating that the second data storage is empty; and a second control gate connected to the pop gate between the top date storage cell and the second data storage cell for providing a pop signal to said pop gate in response to an external pop stack signal and indication signals from the cell state flip-flop of the top control cell indicating that the top data storage cell is empty and from the cell-state flip-flop of the second control cell indicating that the second data storage cell is full.

12. A stack according to claim 11, further comprising an interface circuit for shifting data into the top data storage cell of the stack from an external data channel in response to said external push stack signal and for shifting data from the top data storage cell of the stack into said external data channel in response to said external pop stack signal, wherein the interface circuit comprises a first logic circuit for providing a push acknowledge signal in response to said external push stack signal and an indication signal from the cell state flip-flop of the top control cell indicating that the top data storage cell is empty;

a push gate connected between the input of the top data stoage cell and said external data channel for shifting data into the top data storage cell from the external data channel in response to said push acknowledge signal from the first logic circuit;

a second logic circuit for providing a pop acknowledge signal in response to said external pop stack signal and an indication signal from the cell state flip-flop of the top control cell indicating that the top data storage cell is full; and a pop gate connected between the output of the top data storage cell and said external data channel for shifting data from the top date storage cell into the external data channel in response to said pop acknowledge signal from the second logic circuit.

13. A self-shifting last-in-first-out stack for a data processing system, comprising a linear array of data storage cells interconnected for enabling stored data to be shifted to or from an adjacent cell; and a control circuit connected to the array of data storage cells for causing stored data to be shifted from the (n)th cell in the array from the top of the stack into the (n+1)th cell whenever the (n)th cell is full, the (n+1)th cell is empty and the (n−1)th cell is full; and for causing stored data to be shifted into the (nth) cell from the (n+1)th cell whenever the (n)th cell is empty, the (n+1)th cell is full and the (n−1)th cell is empty, wherein n is an integer greater than one;

wherein the control circuit further comprises a renege prevention network for preventing the control circuit from causing stored data to be shifted from the (n)th cell into the (n+1)th cell while the control circuit is causing stored data to be shifted either into the (n+2)th cell from the (n+3)th cell or into the (n−2)th cell from the (n−1)th cell, and for preventing the control circuit from causing data to be shifted into the (n)th cell from the (n+1)th cell while the control circuit is causing stored data to be shifted either from the (n+2)th cell into the (n+3)th cell or from the (n−2)th cell into the (n−1)th cell.

14. A self-shifting last-in-first-out stack for a data processing system, comprising a linear array of data storage cells interconnected for enabling stored data to be shifted to or from an adjacent cell;

a control circuit connected to the array of data storage cells for causing stored data to be shifted from the (n)th cell in the array from the top of the stack into the (n+1)th cell whenever the (n)th cell is full, the (n+1)th cell is empty and the (n−1)th cell is full; and for causing stored data to be shifted into the (nth) cell from the (n+1)th cell whenever the (n)th cell is empty, the (n+1)th cell is full and the (n−1)th cell is empty, wherein n is an integer greater than one; and an interface circuit for shifting data into the bottom data storage cell of the stack from an external data channel when the bottom m data cells are empty and for shifting data from the bottom data storage cell of the stack into said external data channel when the bottom m data storage cells are full, wherein m is an integer greater than one.

15. A stack according to claim 14, wherein the control circuit includes a plurality of cell- state flip-flops corresponding to the plurality of data storage cells for respectively providing indication signals indicating the storage state of the corresponding data storage cells; and wherein the interface circuit comprises a first logic circuit for providing a push request signal in response to indication signals from the cell-state flip-flops of the bottom m control cells indicating that the bottom m data cells are full;

a push gate connected between the output of the bottom data storage cell and said external data channel for shifting data from the bottom data storage cell into the external data channel in response to said push request signal from the first logic circuit;

a second logic circuit for providing a pop request signal in response to indication signals from the cell state flip-flops of the bottom m control cells indicating that the bottom m data storage cells are empty; and a pop gate connected between the input of the bottom data storage cell and said external data channel for shifting data into the bottom data storage cell from the external data channel in response to said pop request signal from the second logic circuit.

16. A self-shifting last-in-first-out stack for a data processing system, comprising a plurality of parallel linear arrays of data storage cells interconnected for enabling stored data to be shifted to or from an adjacent cell within the same array, wherein the parallel (n)th cells from the top of the stack in the respective arrays define the (n)th word level in the stack; and a control circuit having a linear array of control cells corresponding to the linear arrays of data storage cells, with the (n)th control cell in the array from the top of the stack being connected to the corresponding word level of data storage cells and in its adjacent word levels of data storage cells for sensing the storage states of the corresponding word level of data storage cells, and its adjacent word levels of data storage cells, and in response to said sensed state, for causing stored data to be shifted from each cell of the (n)th word level into the cells of the (n+1)th word level whenever the (n)th word level is full, the (n+1)th word level is empty and the (n−1)th word level is full; and for causing stored data to be shifted into each cell of the (n)th word level from the cells of the (n+1)th word level whenever the (n)th word level is empty, the (n+1)th word level is full and the (n−1)th word level is empty, wherein n is an integer greater than one.

17. A stack according to claim 16, wherein within each linear array of data storage cells the output of each (n)th cell in the array from the top of the stack is connected to the input of the (n+1)th cell by a push gate and is connected to the input of the (n−1)th cell by a pop gate, and the input of each (n)th cell is connected to the output of the (n+1)th cell by a pop gate and is connected to the output of the (n−1)th cell by a push gate;

wherein each push gate is connected to the control circuit for shifting data down from the top of the stack in response to a push signal from the control circuit; and wherein each pop gate is connected to the control circuit for shifting data up toward the top of the stack in response to a pop signal from the control circuit.

18. A stack according to claim 17, wherein the control cells are interconnected for communicating the storage state of the corresponding word levels to and from the adjacent control cells; and wherein each (n)th control cell in the array from the top of the stack includes a cell-state flip-flop for providing indication signals indicating the storage state of the (n)th word level;

a first control gate connected to the push gate between the (n)th data storage cell and the (n+1)th data storage cell in each linear array of data storage cells for providing a push signal to said push gates in response to indication signals from the cell-state flip-flop of the (n)th control cell indicating that the (n)th word level is full, from the cell-state flip-flop of the (n+1)th control cell indicating that the (n+1)th word level is empty, and from the cell-state flip-flop of the (n−1)th control cell indicating that the (n−1)th word level is full; and a second control gate connected to the pop gate between the (n)th data storage cell and the (n+1)th data storage cell in each linear array of data storage cells for providing a pop signal to said pop gates in response to indication signals from the cell-state flip-flop of the (n)th control cell indicating that the (n)th word level is empty, from the cell-state flip-flop of the (n+1)th control cell indicating that the (n+1)th word level is full, and from the cell-state flip-flop of the (n−1)th control cell indicating that the (n−1)th word level is empty.

19. A stack according to claim 18 wherein the control gates of the (n)th control cell are connected to the control gates of the (n+1)th control cell for inhibiting the control gates of the (n+1)th control cell from providing push and pop signals whenever the control gates of the (n)th control cell provide either push or pop signals.

20. A stack according to claim 18, wherein the control gates of the (n)th control cell are connected to the cell-state flip-flops of both the (n)th and (n+1)th control cells for setting or resetting said flip-flop in response to push and pop signals from said control gates so that the indication signals from said flip-flops indicate the storage states of the (n)th and (n+1)th word levels following the shift of data between the (n)th and (n+1)th word levels in response to said push or pop signal.

21. A stack according to claim 18, wherein each data storage cell is a static storage cell that includes a hold gate for completing a feedback loop in said storage cell, said hold gate being connected to the cell-state flip-flop in the corresponding control cell for completing said loop in response to an indication signal from said flip-flop indicating that the corresponding word level is full.

22. A stack according to claim 18, wherein the control circuit further comprises a renege prevention network for preventing the control circuit from providing pop signals to the pop gate between the (n)th data storage cell and the (n+1)th data storage cell in each linear array of data storage cells while a prior push signal is provided to either the push gate between the (n+2)th data storage cell and the (n+3)th data storage cell or the push gate between the (n−2)th data storage cell and the (n−1)th data storage cell, and for preventing the control circuit from providing push signals to the push gate between the (n)th data storage cell and the (n+1)th data storage cell in each linear array of data storage cells while a prior pop signal is provided to either the pop gate between the (n+2)th data storage cell and the (n+3)th data storage cell or the pop gate between the (n−2)th data storage cell and the (n−1)th data storage cell.

23. A stack according to claim 22, wherein the renege prevention circuit includes complementary interlock circuits including a first interlock circuit connected to the output of the first control gate of the (n)th control cell and to the respective outputs of the second control gates of the (n+2)th and (n−2)th control cells for responding to a pop signal from either of the second control gates by preventing a subsequent push signal from being provided to the push gates between the (n)th and the (n+1)th data storage cells during said pop signal; and a second interlock circuit connected to the output of the second control gate of the (n)th control cell and to the respective outputs of the first control gates of the (n+2)th and (n−2)th control cells for responding to a push signal from either of the first control gates by preventing a subsequent pop signal from being provided to the pop gate between the (n)th and the (n+1)th data storage cells during said push signal.

24. A stack according to claim 18, further comprising a stack storage status circuit connected to the cell-state flip-flops in each control cell of the control circuit for providing an "all full" signal when all of the word levels in the array are full, and an "all empty" signal when all of the word levels in the array are empty.

25. A stack according to claim 24, wherein the stack storage status circuit includes a linear array of status cells corresponding to the linear array of control cells with each (n)th status cell in the array from the top of the stack being connected to the cell-state flip-flop in the corresponding control cell and to the adjacent status cells for providing said "all full" signal to the (n−1)th status cell in response to receiving a "full" indication signal from the cell-state flip-flop in the (n)th control cell and an "all full" signal from the (n+1)th status cell, and for providing said "all empty" signal to the (n−1)th status cell in response to receiving an "empty" indication signal from the cell-state flip-flop in the (n)th control cell and an "all empty" signal from the (n+1)th status cell.

26. A stack according to claim 18, wherein the control cell corresponding to the top word level in the stack comprises a cell-state flip-flop for providing indication signals indicating the storage state of the top word level;

a first control gate connected to the push gate between the top data storage cell and the second data storage cell in each linear array of data storage cells for providing a push signal to said push gates in response to an external push stack signal and indication signals from the cell-state flip-flop of the top control cell indicating that the top word level is full and from the cell-state flip-flop of the second control cell indicating that the second word level is empty; and a second control gate connected to the pop gate between the top data storage cell and the second data storage cell in each linear array of data storage cells for providing a pop signal to said pop gates in response to an external pop stack signal and indication signals from the cell-state flip-flop of the top control cell indicating that the pop word level is empty and from the cell-state flip-flop of the second control cell indicating that the second word level is full.

27. A stack according to claim 26, further comprising an interface circuit for shifting data into the top word level of the stack from external parallel data channels in response to said external push stack signal and for shifting data from the top word level of the stack into said external parallel data channels in response to said external pop stack signal, wherein the interface circuit comprises a first logic circuit for providing a push acknowledge signal in response to said external push stack signal and an indication signal from the cell-state flip-flop of the top control cell indicating that the top word level is empty;

push gates connected between the respective inputs of the data storage cells of the top word level and said external parallel data channels for shifting data into the top word level from the external parallel data channels in response to said push acknowledge signal from the first logic circuit;

a second logic circuit for providing a pop acknowledge signal in response to said external pop stack signal and an indication signal from the cell state flip-flop of the top control cell indicating that the top word level is full; and pop gates connected between the respective outputs of the top data storage cells of the top word level and said external parallel data channels for shifting data from the top word level into the external data channel in response to said pop acknowledge signal from the second logic circuit.

28. A self-shifting last-in-first-out stack for a data processing system, comprising a plurality of parallel linear arrays of data storage cells interconnected for enabling stored data to be shifted to or from an adjacent cell within the same array, wherein the parallel (n)th cells from the top of the stack in the respective arrays define the (n)th word level in the stack; and a control circuit connected to the arrays of data storage cells for causing stored data to be shifted from each cell of the (n)th word level into the cells of the (n+1)th word level whenever the (n)th word level is full, the (n+1)th word level is empty and the (n−1)th word level is full; and for causing stored data to be shifted into each cell of the (n)th word level from the cells of the (n+1)th word level whenever the (n)th word level is empty, the (n+1)th word level is full and the (n−1)th word level is empty, wherein n is an integer greater than one;

wherein the control circuit further comprises a renege prevention network for preventing the control circuit from causing stored data to be shifted from the (n)th cell into the (n+1)th cell in each linear array of data storage cells while the control circuit is causing stored data to be shifted either into the (n+2)th cell from the (n+3)th cell or into the (n−2)th from the (n−1)th cell and for preventing the control circuit from causing data to be shifted into the (n)th cell from the (n+1)th cell in each linear array of data storage cells while the control circuit is causing stored data to be shifted either from the (n+2)th cell into the (n+3)th cell or from the (n−2)th cell into the (n−1)th cell.

29. A self-shifting last-in-first-out stack for a data processing system, comprising a plurality of parallel linear arrays of data storage cells interconnected for enabling stored data to be shifted to or from an adjacent cell within the same array, wherein the parallel (n)th cells from the top of the stack in the respective arrays define the (n)th word level in the stack;

a control circuit connected to the arrays of data storage cells for causing stored data to be shifted from each cell of the (n)th word level into the cells of the (n+1)th word level whenever the (n)th word level is full, the (n+1)th word level is empty and the (n−1)th word level is full; and for causing stored data to be shifted into each cell of the (n)th word level from the cells of the (n+1)th word level whenever the (n)th word level is empty, the (n+1)th word level is full and the (n−1)th word level is empty, wherein n is an integer greater than one; and an interface circuit for shifting data into the bottom word level of the stack from external parallel data channels when the bottom m word levels are empty and for shifting data from the bottom word level of the stack into said external parallel data channels when the bottom m word levels are full, wherein m is an integer greater than one.

30. A stack according to claim 29, wherein the control circuit includes a plurality of cell-state flip-flops corresponding to the plurality of word levels for respectively providing indication signals indicating the storage state of the corresponding word levels; and wherein the interface circuit comprises a first logic circuit for providing a push request signal in response to indication signals from the cell state flip-flops of the bottom m control cells indicating that the bottom m word levels are full;

push gates connected between the respective outputs of the data storage cells of the bottom word level and said external parallel data channels for shifting data from the bottom word level into the external data channels in response to said push request signal from the first logic circuit;

a second logic circuit for providing a pop request signal in response to indication signals from the cell state flip-flops of the bottom m control cells indicating that the bottom m word levels are empty; and pop gates connected between the respective inputs of the data storage cells of the bottom word level and said external parallel data channels for shifting data into the bottom word level from the external parallel data channels in response to said pop request signal from the second logic circuit.

31. A self-shifting last-in-first-out stack for a data processing system, comprising a plurality of parallel linear arrays of data storage cells interconnected for enabling stored data to be shifted to or from an adjacent cell within the same array, wherein the parallel (n)th cells from the top of the stack in the respective arrays define the (n)th word level in the stack;

a control circuit connected to the arrays of data storage cells for causing stored data to be shifted from each cell of the (n)th word level into the cells of the (n+1)th word level whenever the (n)th word level is full, the (n+1)th word level is empty and the (n−1)th word level is full; and for causing stored data to be shifted into each cell of the (n)th word level from the cells of the (n+1)th word level whenever the (n)th word level is empty, the (n+1)th word level is full and the (n−1)th word level is empty, wherein n is an integer greater than one;

a discrete linear array of data storage cells interconnected for enabling data to be shifted to or from an adjacent cell, wherein the discrete array includes a number of data storage cells corresponding to the number of parallel linear arrays in the stack, with the cells of the discrete array being coupled to the cells of the top word level of the stack for enabling data to be shifted therebetween;

a second control circuit connected to the discrete array of data storage cells for causing stored data to be shifted from the (m)th cell in the discrete array from one end of the discrete array into the (m+1)th cell whenever the (m)th cell is full, the (m+1)th cell is empty and the (m−1)th cell is full; and for causing stored data to be shifted into the (m)th cell from the (m+1)th cell whenever the (m)th cell is empty, the (m+1)th cell is full and the (m−1)th cell is empty; wherein the second control circuit includes a linear array of control cells corresponding to the discrete linear array of data storage cells, wherein each (m)th control cell in the second control cell array from the one end thereof includes a cell-state flip-flop for providing indication signals indicating the storage state of the (m)th data storage cell; and a stack storage status circuit connected to the cell-state flip-flops in each control cell of the second control circuit for providing an "all empty" signal when all of the data storage cells in the discrete array are empty for enabling data to be shifted serially into the discrete array from an external data channel, and for providing an "all full" signal when all of the data storage cells in the discrete array are full for enabling data stored in the discrete array to be shifted in parallel into the top word level.

* * * * *